(12) United States Patent
Viscuso et al.

(10) Patent No.: US 11,182,478 B2
(45) Date of Patent: *Nov. 23, 2021

(54) SYSTEMS AND METHODS FOR TRACKING AND RECORDING EVENTS IN A NETWORK OF COMPUTING SYSTEMS

(71) Applicant: Carbon Black, Inc., Waltham, MA (US)

(72) Inventors: Michael Viscuso, Oakton, VA (US); Benjamin Johnson, Newport Beach, CA (US); Allen Saunders, Potomac Falls, VA (US); Andrew Ruef, Columbia, MD (US); Jason James McFarland, Fair Oaks Ranch, TX (US)

(73) Assignee: Carbon Black, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/165,301

(22) Filed: Oct. 19, 2018

(65) Prior Publication Data

US 2019/0220593 A1 Jul. 18, 2019

Related U.S. Application Data

(63) Continuation of application No. 13/420,563, filed on Mar. 14, 2012, now Pat. No. 10,185,822.

(51) Int. Cl.
*G06F 21/55* (2013.01)

(52) U.S. Cl.
CPC ................................. *G06F 21/554* (2013.01)

(58) Field of Classification Search
CPC . H04L 63/1416; H04L 63/20; H04L 63/1425; H04L 63/1408; H04L 41/0631; G06F 21/552; G06F 21/554; G06F 21/577; G06F 21/52; G06F 21/53; G06F 2009/45587; G06F 21/54; G06F 2201/86; G06F 9/542

See application file for complete search history.

(56) References Cited

U.S. PATENT DOCUMENTS

| | | | | |
|---|---|---|---|---|
| 5,974,549 A | * | 10/1999 | Golan | G06F 9/468 714/47.3 |
| 7,398,530 B1 | * | 7/2008 | Parla | G06F 9/542 714/2 |
| 7,484,245 B1 | * | 1/2009 | Friedman | G06F 21/52 380/283 |
| 7,533,414 B1 | * | 5/2009 | Reed | G06F 21/552 709/225 |
| 7,596,611 B1 | * | 9/2009 | Satish | H04L 29/08729 709/223 |

(Continued)

*Primary Examiner* — Trang T Doan

(57) ABSTRACT

A security client can be configured to operate on the one or more computing systems and record all events occurring on the one or more computing systems. The security client can operate as a "security camera" for the computing systems by identifying and retaining data and information that describes and details different events that occur on the computing systems. The security client can be configured to generate event records for the events that are uniquely associated with the process that requested or performed event. Likewise, the security client can be configured to uniquely associate the event records with the specific computing system associated with the event.

20 Claims, 5 Drawing Sheets

(56) References Cited

U.S. PATENT DOCUMENTS

| | | | | |
|---|---|---|---|---|
| 8,640,232 | B2* | 1/2014 | Small | G06F 11/3476 |
| | | | | 726/22 |
| 8,839,435 | B1* | 9/2014 | King | G06F 21/56 |
| | | | | 726/24 |
| 2003/0154402 | A1* | 8/2003 | Pandit | G06F 21/552 |
| | | | | 726/23 |
| 2006/0120526 | A1* | 6/2006 | Boucher | H04L 63/12 |
| | | | | 380/247 |
| 2007/0028116 | A1* | 2/2007 | Murison | G06Q 10/00 |
| | | | | 713/181 |
| 2008/0134214 | A1* | 6/2008 | Goswami | G06F 11/3476 |
| | | | | 719/318 |
| 2008/0148398 | A1* | 6/2008 | Mezack | H04L 63/1416 |
| | | | | 726/22 |
| 2009/0126017 | A1* | 5/2009 | Chahal | G06F 21/6218 |
| | | | | 726/23 |
| 2009/0138595 | A1* | 5/2009 | Sluiman | G06F 11/3447 |
| | | | | 709/224 |
| 2009/0276407 | A1* | 11/2009 | Van Vleet | G06F 16/9535 |
| 2010/0077481 | A1* | 3/2010 | Polyakov | G06F 21/568 |
| | | | | 726/24 |
| 2011/0022444 | A1* | 1/2011 | Fridman | G06Q 30/02 |
| | | | | 705/14.64 |
| 2011/0239296 | A1* | 9/2011 | Schipper | H04N 7/163 |
| | | | | 726/22 |
| 2013/0055339 | A1* | 2/2013 | Apostolescu | H04L 63/1408 |
| | | | | 726/1 |

* cited by examiner

SYSTEMS AND METHODS FOR TRACKING AND RECORDING EVENTS IN A NETWORK OF COMPUTING SYSTEMS

CROSS-REFERENCE TO RELATED APPLICATIONS

This application is a continuation of and claims priority to U.S. patent application Ser. No. 13/420,563 (issued as U.S. Pat. No. 10,185,822), titled "SYSTEMS AND METHODS FOR TRACKING AND RECORDING EVENTS IN A NETWORK OF COMPUTING SYSTEMS" and filed on Mar. 14, 2012, which is hereby incorporated by reference herein in its entirety.

FIELD

This disclosure relates generally to computer security.

BACKGROUND

In today's distributed computing environments, security is of the utmost importance. Malicious actors often utilize this ease of accessibility and anonymity to attack users' computing systems remotely across public networks and private networks. For example, the malicious actors can plant viruses, Trojans, or other malicious software in available content in order to attack the users' computing systems and steal sensitive information from the users. Likewise, the malicious actors can perform direct attacks on the user's computing systems across the networks.

When a malicious actor gains access to a user's computing system or network, significant time is required to figure out how the malicious actor gained access, what actions did the malicious actor perform, whether the malicious actors still has access, and on what computing systems does the malicious actor still have access. Often times to determine the fallout of the malicious actor's attack, users must perform detailed research and investigation such as digital forensics (e.g. filesystem analysis and log analysis). Digital Forensics relies upon using secondary and tertiary data points that reside on the computing system to make guesses about what actually happened. Unfortunately, just like criminals in the physical world, the malicious actor knows how to cover its tracks so that the evidence of the breach is not usually there anymore.

Accordingly, there is a need for increased efficiency and quality of incident response in identifying and addressing security concerns in computing systems and, networks.

SUMMARY

Various embodiments of the present teachings relate to a method for tracking activity on a computing system. The method includes detecting an event, associated with a process, occurring in the computing system. The method also includes generating an event identifier for the event, wherein the event identifier uniquely identifies the event in the computing system. Additionally, the method includes generating a record for the event, the record comprising the event identifier and details that describe the event.

Additional embodiments relate to a computer readable storage medium comprising instructions that cause a processor to perform a method comprising. The method includes detecting an event, associated with a process, occurring in the computing system. The method also includes generating an event identifier for the event, wherein the event identifier uniquely identifies the event in the computing system. Additionally, the method includes generating a record for the event, the record comprising the event identifier and details that describe the event.

Additional embodiment relate to a method for computer security. The method includes receiving at least one event record for an event associated with a process executing on a computing system, wherein the at least one event record comprises an event identifier that uniquely identifies the event in the computing system, details of the event, and a global identifier that uniquely identifies the event and the computing system. The method also includes storing the at least one event record in a computer readable storage medium.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the present teachings are described by referring mainly to examples of various embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various embodiments. Electrical, mechanical, logical and structural changes can be made to the examples of the various embodiments without departing from the spirit and scope of the present teachings. The following detailed description is, therefore, not to be taken in a limiting sense and the scope of the present teachings is defined by the appended claims and their equivalents.

Embodiments of the present disclosure are directed to systems and methods that automatically identify, track, and record activity occurring on one or more computing systems. In particular, a security client can be configured to operate on the one or more computing systems and record all events occurring on the one or more, computing systems. The security client can operate as a "security camera" for the computing systems by identifying and retaining data and information that describes and details different events that occur on the computing systems. The security client can be configured to generate event records for the events that are uniquely associated with the process that requested or performed event. Likewise, the security client can be configured to uniquely associate the event records with the specific computing system associated with the event.

By automatically recording events and uniquely associating the events with a process and computing system, a forensic investigator can answer the 5 W's (who, what, when, where, and why) without having to perform the laborious and highly skilled acts of forensics. The investigator can examine the recorded event to "roll back the tape" and watch what happened prior to, during, and after a security breach.

Figure 1A:
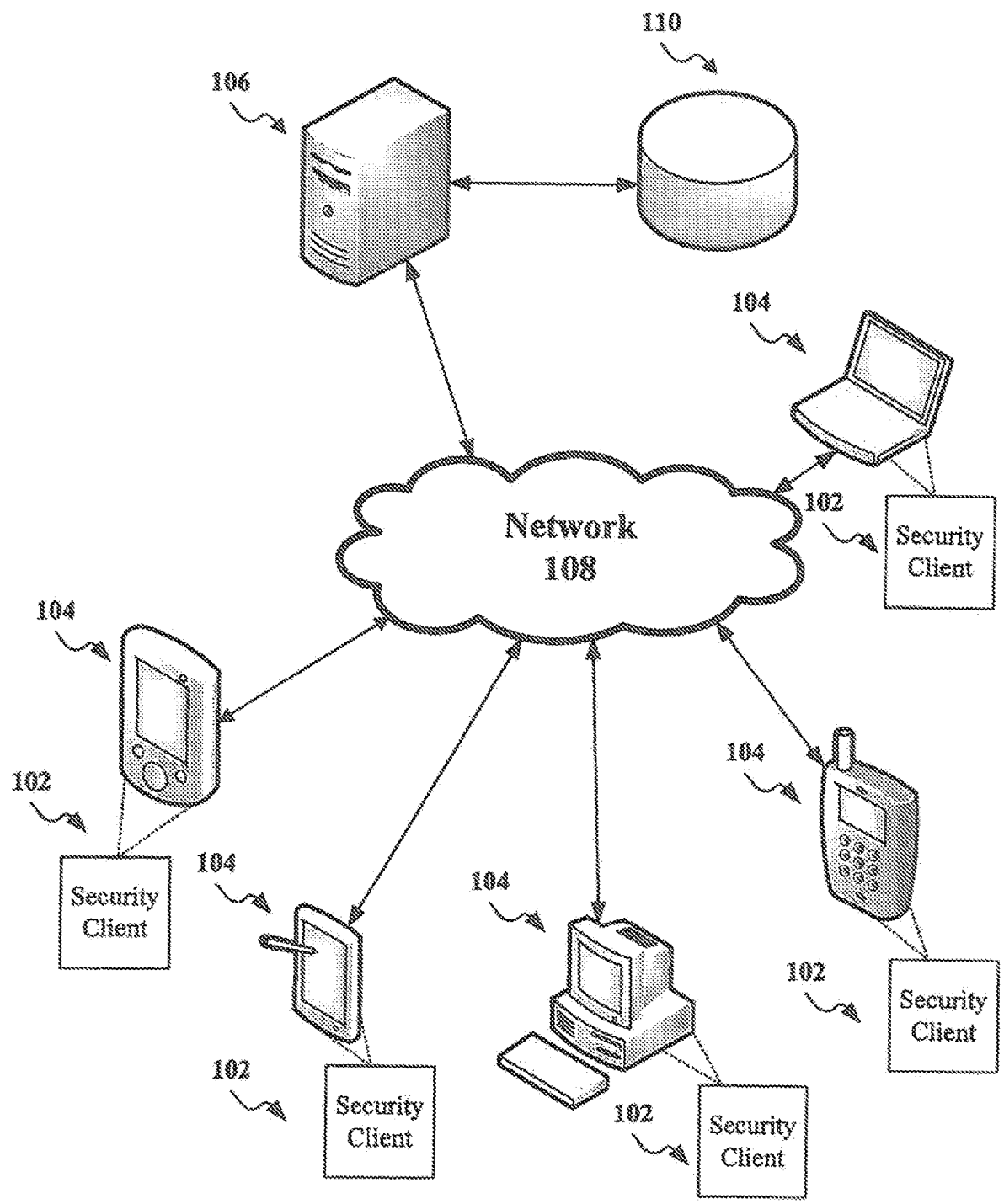
FIGS. 1A and 1B are generic block diagrams that illustrate a network environment in which a security client can track and record events, according to various embodiments.
Figure 1B:
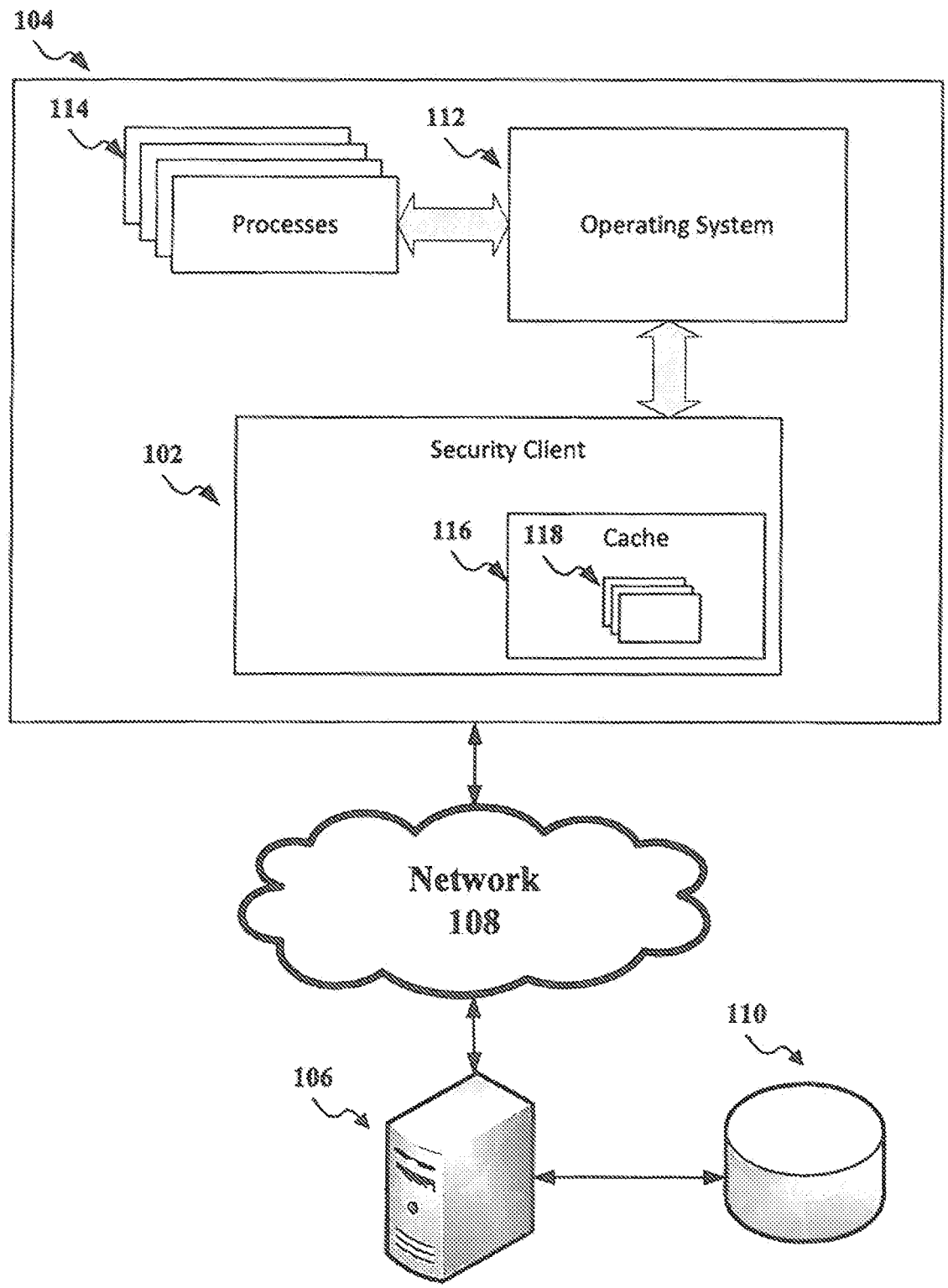

FIGS. 1A and 1B illustrate a computing environment 100 in which a security client 102 can operate on computing systems to identify, track, and record events occurring on the computing systems. While FIGS. 1A and 1B illustrate various components contained in the computing environment 100, one skilled in the art will realize that FIGS. 1A and 1B are examples of the computing environment 100 and that additional components can be added and existing components can be removed.

As illustrated in FIG. 1A, the computing environment 100 can include a number of computing systems 104. The computing systems 104 can represent the systems of public or private entities, such as governmental agencies, individuals, businesses, partnerships, companies, corporations, etc., utilized to support the entities. The computing systems 104 can be any type of conventional computing systems, such as desktops, laptops, servers, etc., or mobile devices, such as smart telephones, tablet computers, cellular telephones, personal digital assistants, etc. The computing systems 104 can include hardware resources, such as processors, memory, network hardware, storage devices, and the like, and software resources, such as operating systems (OS), application programs, and the like.

The computing environment 100 can also include a remote computing system 106 located remotely from the computing systems 104. The remote computing system 106 can be any type of conventional computing system, such as desktop, laptop, server, etc. The computing system 106 can include hardware resources, such as processors, memory, network hardware, storage devices, and the like, and software resources, such as OS, application programs, and the like. The computing systems 104 and the remote computing system 106 can be coupled to one, or more networks 108. The one or more networks 108 can be any type of communications networks, whether wired or wireless, to allow the computing system to communicate, such as wide-area networks or local-area networks.

In embodiments, the owners, administrators, and users of the computing systems 104 and/or remote computing system 106 can desire to identify, track, and record activity occurring on the computing systems 104. For example, the owners, administrators, and users can desire to record a complete history of activities occurring on the computing systems 104 and networks in order to quickly and easily identify the cause or causes of security breaches and efficiently address the security breaches. Accordingly, each of the computing systems 104 can be configured to store and execute the security client 102. The security client 102 can be configured to execute on a computing system 104 to identify, track, and record all events occurring on the computing system 104. The security client 102 can be configured to generate event records for the events, occurring on the computing system 104, that are uniquely associated with the process that requested or performed event. Likewise, the security client 102 can be configured to uniquely associate the event records with the specific computing system associated with the event.

As described herein, an event can be any action taken, performed, or requested by a process running and/or executing on the computing systems 104. Likewise, as described herein, a process can be an instance of a software program, application, and/or module running and/or executing on the computing systems 104. For example, a event can include, initiation of the process, a request to start a new process, a request to create a file, a request to modify a file, a request to delete a file, request to create a registry key, a request to delete a registry key, a request to modify a registry key, a request to establish a network connection, a request to load a binary, and the like.

The security client 102 can be configured as an application program that is capable of being stored on and executed by the computing systems of the computing environment 100, such as the computing systems 104 and the remote computing system 106. The security client 102 can be written in a variety of programming languages, such as Ruby, JAVA, C++, Python code, Visual Basic, hypenext markup language (HTML), extensible markup language (XML), and the like to accommodate a variety of operating systems, computing system architectures, etc. The security client 102 can be a stand-alone application program and/or can be a software module that is capable of being incorporated in other software, such as operating systems and/or application programs.

FIG. 1B illustrates a more detailed view of a computing system 104 that is executing the security client 102. As illustrated, the security client 102 can be configured to run on the computing system 104 and cooperate with an OS 112 in order to automatically identify, track, and record events occurring in the computing system 104. In particular, the security client 102 can communicate with the OS 112 to identify and record events that are associated with processes 114.

The OS 112 can be designed to include multiple levels or layers, to handle requests made by the process 114. When a particular process 114 performs an action, the process 114 can make a request to the OS 112. The process 114 can make the request at a high layer, and the OS 112 can pass, for example to different drivers or modules, the request down the layers until the requested action is performed. For example, a process 114 can make a request to write or modify a file stored on the computing system 104. The process 114 can provide the request to the OS 112 that specifies the filename and the location of the file in storage. Once received, the OS 112 can translate the location, which is a virtual memory address, into a physical memory address. Then, the OS 112 can perform other operations such as encryption/decryption. Then, the OS 112 can translate the physical memory address into the physical location on the hard drive, e.g. platen, sector, etc., and retrieve/store the file based on the physical location.

In embodiments, the security client 102 can be configured to cooperate with the OS 112 and detect actions performed and/or requested by the processes 114 as events occurring in the computing systems 104. To seamlessly detect and record the events, the security client 102 can be configured to intercept requests at lower layers of the device layering in the OS 112. For example, in the write/modify example, the security client 102 can be configured to monitor for requests to the hard drive device driver and record the requests as an event.

In embodiments, the security client 102 can be configured to monitor for and to intercept requests made to the OS 112 at the various device layers in order to identify any events occurring that are associated with the processes 114. When an event is detected, the security client 102 can be configured to identify the process associated with the event, the details of the event, and the time the event occurs. In particular, the security client 102 can be configured to examine the request that was intercepted to identify the process 114, which made the request, and details of the event. The details can include a type of the event (file read/write, registry modification, network connection, etc.), the parameters of the event (e.g. file request read/write, details of the network connection, etc), and the like. Likewise, the security client 102 can be configured to identify the time of the event. The security client 102 can obtain the time of the event from the OS 112, which can provide times at the resolution of nanoseconds.

In embodiments, once an event is detected and, the details, identified, the security client 102 can be configured to create an event record for the event that uniquely records the event. In particular, the security client 102 can be configured to generate an event identifier for each event that is unique to each event. The security client 102 can be configured to generate the event identifier by applying a hash operation to information associated with the event and/or process and the time the event occurs. The hash operation can be any type of mathematical function and/or algorithm that takes various inputs and generates an output sting that is different for different inputs. The security client 102 can utilize any of the details of the event and/or process in combination with time of event to generate the event identifier. For example, the security client 102 can apply a hash operation to the name of the process associated with the event and the time the event occurred to generate the event identifier. Once skilled in the art realize that the security client 102 can utilize any number of the details of the event and/or process in combination with time of event to generate the event identifier. Because the details of the event and the time of the event are utilized, which has a resolution of nanoseconds, the security client 102 can generate the event identifier that will be different from each event.

In embodiments, once the event identifier is generated, the security client 102 can be configured to generate an event record for the event. The event record can include the event identifier and the details of the event. For example, the event record can include the event identifier, the name of the process associated with the event, the time the event occurred, and details of the event such as type of the event (file read/write, registry modification, network connection, etc.), the parameters of the event (e.g. file request read/write, details of the network connection, etc.), and the like.

In embodiments, once the event record is generated, the security client can be configured to store the event record in a cache 116. The cache 116 can be any type of: data structure that can store the event records for a computing system 104. The security client 102 can be configured to maintain the cache 116 in one or more of the computer readable storage media of the computing systems 104. The security client 102 can be configured to store a number of event records 118 in the cache 116. The security client 102 can be configured to forward the event records 118 to the remote computing system 106 periodically and/or upon the occurrence of a condition. The conditions can include a request by a user, a request by the remote computing system 106, power up/down of the computing system 104, occurrence of a security breach, and the like.

In embodiments, prior to forwarding the event records 118, the security client 102 can be configured to generate a global identifier for each event record 118. The global identifier can be configured to uniquely identify the computing system 104 that is associated with each event record 118. The security client 102 can be configured to generate the global identifier for a particular event record by applying a hash operation the event identifier for that event record and attributes of the computing system 104 associated with that event record. The hash operation can be any type of mathematical function and/or algorithm that takes various inputs and generates an output sting that is different for different inputs. The security client 102 can utilize any of the attributes of the computing system 104 in combination with the event identifier to generate the global identifier for an event record. For example, attributes of the computing system 104 can include a type of the computing system 104, a name of the computing system 104, a configuration of the computing system 104, a network address of the computing system 104, a media access control (MAC) address of the computing system 104, information about a user of the computing system 104, a telephone number associated with the computing system 104, and the like. The security client 102 can utilize any number of the attributes in combination with the event identifier to generate the global identifier for an event record.

In embodiment, once received, the remote computing system 106 can be configured to store the event records in a repository 110. The remote computing system 106 can be configured to store the event records for each of the computing system 104 in the computing environment 100. The repository 110 can be any type of data structure and/or database that can store the event records associated with the computing systems 104 and that can allow the remote computing system 106 (or other computing systems) to search and retrieve the event records. Because each event record includes both a global identifier and an event identifier, each event record can be attributed to a specific computing system 104 in the computing environment 100 and a specific process on the computing system 104. As such, the remote computing system 106 (or other computing systems) can easily and efficiently analyze the computing systems 104, identify and attribute an event to a computing system 104, relate and link different events, and the like. Accordingly, the remote computing system 106 (or other computing system) address security concerns in the computing environment 100.

Figure 2:
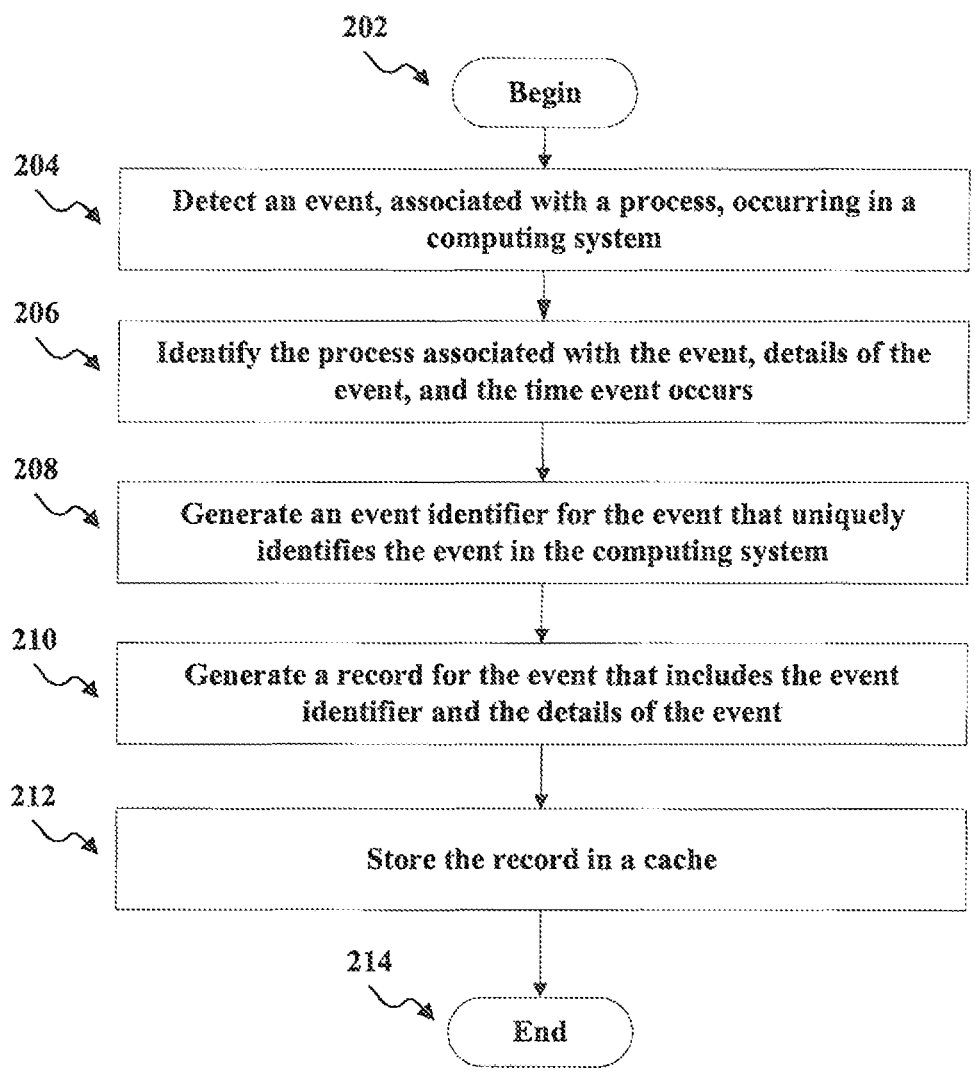
FIG. 2 is a flow diagram that illustrates a process for tracking and recording events in a computing system, according to various embodiments.

FIG. 2 illustrates an example of a process that can be performed by the security client 102 to identify, track, and record an event, according to various embodiments. Likewise, one skilled in the art will realize that the illustrated stages of the processes are exemplary and that any of the illustrated stages can be removed, additional stages can be added, and the order of the illustrated stages can be changed.

In 202, the process can begin. In 204, the security client 102 can detect an event, associated with a process, occurring in a computing system. For example, the security client 102 can monitor for and intercept requests made to the OS 112 at the various device layers in order to identify any events occurring that are associated with the processes 114.

In 206, the security client 102 can identify the process associated with the event, details of the event, and a time the event occurs. For example, the security client 102 can examine the request that was intercepted to identify the process 114, which made the request, and details of the event. The details can include a type of the event, (file read/write, registry modification, network connection, etc.), the parameters of the event (e.g. file request read/write, details of the network connection, etc.) Likewise, the security client 102 can obtain the time of the event from the OS 112, which can provide times at the resolution of nanoseconds.

In 208, the security client 102 can generate an event identifier for the event that uniquely identifies the event in the computing system. For example, the security client 102 can generate the event identifier by applying a hash operation to information about the event and/or process and the time the event occurs. The security client 102 can utilize any of the details of the event and/or process in combination with time of event to generate the event identifier. For instance, the security client 102 can apply a hash operation to the name of the process associated with the event and the time the event occurred to generate the event identifier.

In 210, the security client 102 can generate a record for the event that includes the event identifier and details of the event. The event record can include the event identifier and the details of the event. In 212, the security client 102 can store the event record in a cache. For example, the security client 102 can store the event record in the cache 116.

In 214, the process can end, return to any point or repeat.

Figure 3:
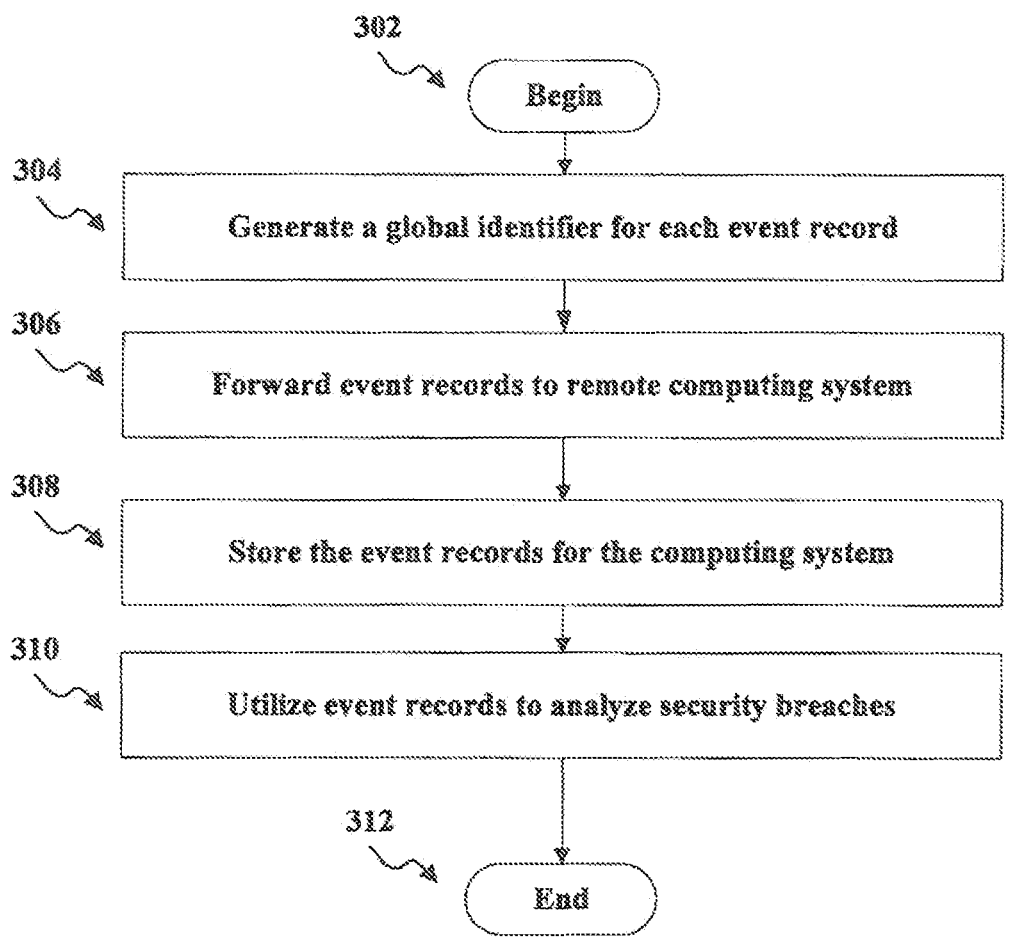
FIG. 3 is a flow diagram that illustrates a process for consolidating event records, according to various embodiments.

FIG. 3 illustrates an example of a process that can be performed by the security client 102 and/or the remote computing system 106 to consolidate event records, according to various embodiments. Likewise, one skilled in the art will realize that the illustrated stages of the processes are exemplary and that any of the illustrated stages can be removed, additional stages can be added, and the order of the illustrated stages can be changed.

In 302, the process can begin. In 304, the security client 102 can generate a global identifier for each event record. For example, for each event record 118, the security client 102 can generate the global identifier for each event record 118 by applying a hash operation the event identifier for each event record 118 and attributes of the computing system 104 associated with each event record 118. The hash operation can be any type of mathematical function and/or algorithm that takes various inputs and generates an output sting that is different for different inputs. The security client 102 can utilize any of the attributes of the computing system 104 in combination with the event identifier to generate the global identifier for an event record. For example, attributes of the computing system 104 can include a type of the computing system 104, a name of the computing system 104, a configuration of the computing system 104, a network address of the computing system 104, a media access control (MAC) address of the computing system 104, information about a user of the computing system 104, a telephone number associated with the computing system 104, and the like. The security client 102 can utilize any number of the attributes in combination with the event identifier to generate the global identifier for an event record.

In 306, the security client 102 can forward the event records to a remote computing system. For example, the security client 102 can forward the event records 118, each of which includes the associated global identifier, to the remote computing system 106 via the network 108. The security client 102 can utilize any type of communication protocol or method to forward the event records 118 to the remote computing system 106. The security client 102 can forward the event records 118 to the remote computing system 106 periodically and/or upon the occurrence of a condition. The conditions can include a request by a user, a request by the remote computing system 106, power up/down of the computing system 104, occurrence of a security breach, and the like.

In 308, the remote computing system 106 can store the events records for the computing systems 104. For example, the remote computing system 106 can store the event records 118 in the repository 110. The repository 110 can be any type of data structure and/or database that can store the event records associated with the computing systems 104 and that can allow the remote computing system 106 (or other computing systems) to search and retrieve the event records.

In 310, the remote computing system 106 can utilize the event records to analyze security breaches. For example, when a security breach occurs in a particular computing system 104, the remote computing system 106 can search the repository 110 to identify and retrieve the event records for the particular computing system 104. The remote computing system 106 (or other computing system) can analyze the event records, identify and attribute an event to the security breach, relate and link different events that might be related to the security breach, and search other event records from other computing systems 104 that might be related, and, the like.

In 312, the process can end, return to any point or repeat.

While the above processes describe utilizing the event records to analyze and address security concerns, one skilled in the art will realize that the event records can be utilized for any purpose or processing which the events occurring on the computing systems 104 are relevant. Additionally, while the above processes describe consolidating the event records for computing systems 104 on the remote computing system 106, one skilled in the art will realize that the event records can be consolidated on any computing system, for example, one or more of the computing systems 104.

Figure 4:
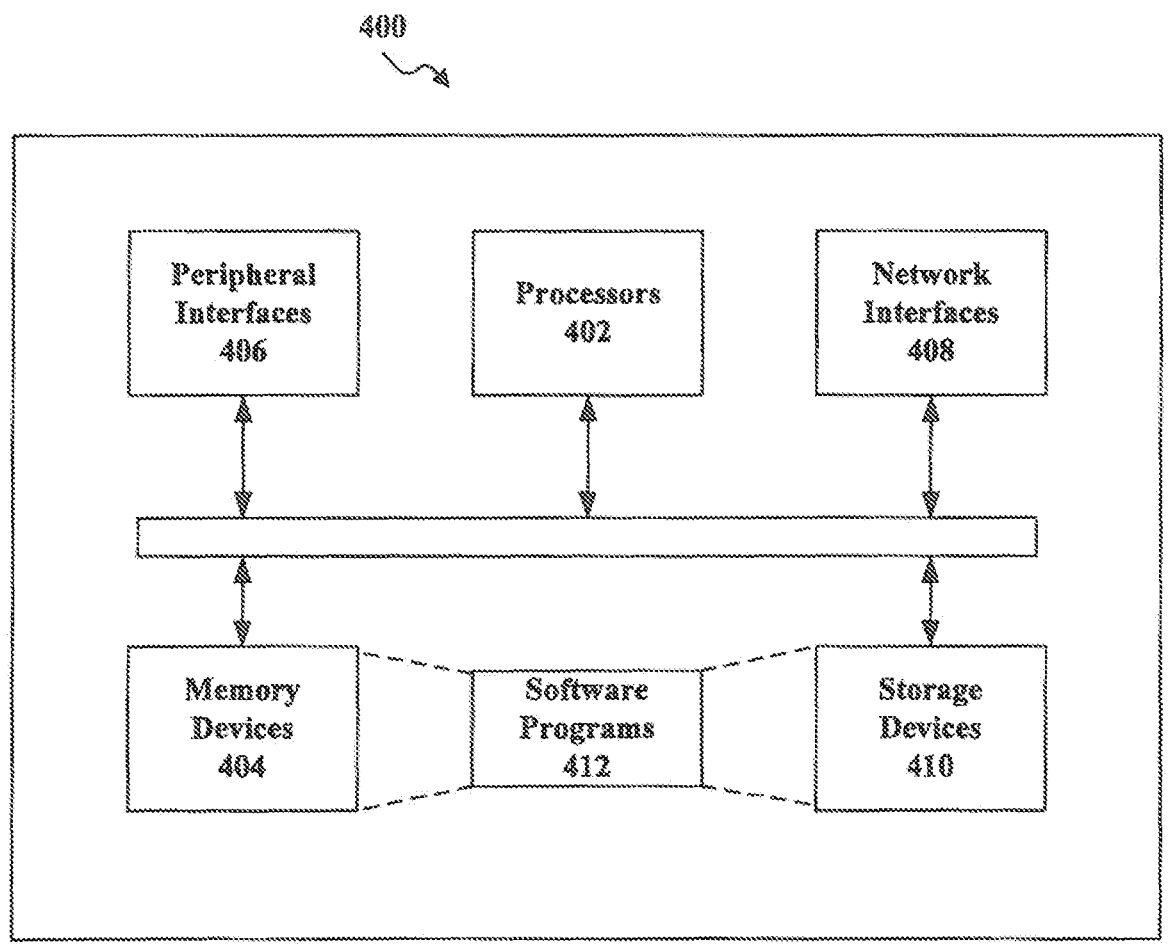
FIG. 4 is a diagram of a computing system, according to various embodiments.

FIG. 4 is a diagram depicting an exemplary hardware configuration for a computing system 400, such as the computing system 104 or the remote computing system 106 that can be used to perform one or more of the processes described above. While FIG. 4 illustrates various components contained in the computing system 400, one skilled in the art will realize that FIG. 4 is one example of a computing device and that additional components can be added and existing components can be removed.

As illustrated in FIG. 4, the computing system 400 can include one or more processors 402 of varying core configurations and clock frequencies. The computing system 400 can also include one or more memory devices 404 that serve as a main memory during the operation of the computing system 400. The computing system 400 can also include one or more peripheral interfaces 406, such as keyboards, mice, touchpads, computer screens, touchscreens, etc., for enabling human interaction with and manipulation of the computing system 400.

The computing system 400 can also include one or more network interfaces 408 for communicating via one or more networks, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc. The computing system 400 can also include one or more storage device 410 of varying physical dimensions and storage capacities, such as flash drives, hard drives, random access memory, etc., for storing data, such as images, files, and program instructions for execution by the one or ore processors 402.

Additionally, the computing system 400 can include one or more software programs 412, such as the security client 102. The one or more software programs 412 can include instructions that cause the one or more processors 402 to perform the processes described. The one or more software programs can be stored in the one or more memory devices 404 and/or on in the one or more storage devices 410.

In embodiments, the components of the computing system 400 need not be enclosed within a single enclosure or even located in close proximity to one another. Those skilled in the art will appreciate that the above-described componentry are examples only, as the computing system 400 can include any type of hardware componentry, including any necessary accompanying firmware or software, for performing the disclosed embodiments. The computing system 400 can also be implemented in part or in whole by electronic circuit components or processors, such as application-specific integrated circuits (ASICs) or field-programmable gate arrays (FPGAs).

Certain embodiments described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A computer security method comprising:
    detecting an event, associated with a process, occurring in a computing system, wherein detecting the event comprises intercepting an operation at a layer of an operating system of the computing system;
    generating, by a processor, an event identifier for the event, wherein the event identifier uniquely identifies the event in the computing system;
    generating a record for the event, the record comprising the event identifier and details that describe the event;
    generating a global identifier for the record based on the event identifier and attributes of the computing system on which the event occurred, wherein the global identifier uniquely identifies the computing system that is associated with the record among a plurality of computing systems including the computing system;
    identifying a security breach in the computing system;
    based at least on the security breach, retrieving, using the global identifier, the record associated with the computing system from a plurality of records associated with the plurality of computing systems; and
    determining that the retrieved record associated with the computing system relates to the security breach associated with the computing system, contents of the retrieved record being indicative of an event relating to the security breach.

2. The method of claim 1, wherein generating the event identifier comprises:
    performing a hash operation on information associated with the event to generate the event identifier.

3. The method of claim 2, wherein the information comprises at least one of the following: details of the event, the process, and a time the event occurred.

4. The method of claim 1, the method further comprising:
    providing the record and the global identifier to a central repository for storage with the global identifier; and
    analyzing the retrieved record associated with the computing system, wherein the retrieved record is retrieved from the central repository storing the plurality of records associated with the plurality of computing systems.

5. The method of claim 1, wherein generating the global identifier comprises:
    performing a hash operation on the attributes associated with the computing system and the event identifier to generate the global identifier.

6. The method of claim 1, wherein the contents comprise the event identifier.

7. The method of claim 1, wherein the record includes the global identifier and the event identifier.

8. The method of claim 1, the method further comprising:
    searching event records of at least another one of the plurality of computing systems for at least one event record related to the security breach associated with the computing system.

9. A non-transitory computer readable storage medium comprising instructions that cause a processor to perform a method comprising:
    detecting an event, associated with a process, occurring in a computing system, wherein detecting the event comprises intercepting an operation at a layer of an operating system of the computing system;
    generating an event identifier for the event, wherein the event identifier uniquely identifies the event in the computing system;
    generating a record for the event, the record comprising the event identifier and details that describe the event;

generating a global identifier for the record based on the event identifier and attributes of the computing system on which the event occurred, wherein the global identifier uniquely identifies the computing system that is associated with the record among a plurality of computing systems including the computing system;

identifying a security breach in the computing system;

based at least on the security breach, retrieving, using the global identifier, the record associated with the computing system from a plurality of records associated with the plurality of computing systems; and determining that the retrieved record associated with the computing system relates to the security breach associated with the computing system, contents of the retrieved record being indicative of an event relating to the security breach.

10. The non-transitory computer readable storage medium of claim 9, wherein generating the event identifier comprises:

performing a hash operation on information associated with the event to generate the event identifier.

11. The non-transitory computer readable storage medium of claim 10, wherein the information comprises at least one of the following: details of the event, the process, and a time the event occurred.

12. The non-transitory computer readable storage medium of claim 9, the method further comprising:

providing the record and the global identifier to a central repository for storage with the global identifier.

13. The non-transitory computer readable storage medium of claim 9, wherein generating the global identifier comprises:

performing a hash operation on the attributes associated with the computing system and the event identifier to generate the global identifier.

14. The non-transitory computer readable storage medium of claim 9, wherein the event comprises at least one of the following: initiation of the process, a request to start a new process, a request to create a file, a request to modify a file, a request to delete a file, request to create a registry key, a request to delete a registry key, a request to modify a registry key, a request to establish a network connection, and a request to load a binary.

15. The non-transitory computer readable storage medium of claim 9, wherein the attributes associated with the computing system include at least one of the following: a type of the computing system, a name of the computing system, a configuration of the computing system, a network address of the computing system, a media access control (MAC) address of the computing system, information about a user of the computing system, and a telephone number associated with the computing system.

16. The non-transitory computer readable storage medium of claim 9, the method further comprising:

searching event records of at least another one of the plurality of computing systems for at least one event record related to the security breach associated with the computing system.

17. A method for computer security, the method comprising:

receiving an event record for an event associated with a process executing on a computing system, the event being detected by intercepting an operation at a layer of an operating system of the computing system, wherein the event record comprises details of the event and a global identifier that uniquely identifies the computing system that is associated with the event record among a plurality of computing systems including the computing system, wherein the global identifier is based on an event identifier that uniquely identifies the event in the computing system and attributes of the computing system;

storing the event record in a computer readable storage medium having a plurality of event records associated with the plurality of computing systems, each of the plurality of event records indicative of a respective event detected on a respective computing system;

identifying a security breach in the computing system;

based at least on the security breach, retrieving, using the global identifier, the event record associated with the computing system from the plurality of event records associated with the plurality of computing systems; and determining that the retrieved event record associated with the computing system relates to the security breach associated with the computing system, contents of the retrieved event record being indicative of an event relating to the security breach.

18. The method of claim 17, wherein the event identifier is generated by performing a hash operation on information associated with the event.

19. The method of claim 17, wherein the global identifier is generated by performing a hash operation on attributes associated with the computing system and the event identifier.

20. The method of claim 17, the method further comprising:

searching event records of at least another one of the plurality of computing systems for at least one event record related to the security breach associated with the computing system.

* * * * *